US009712570B1

(12) United States Patent
Ivov et al.

(10) Patent No.: US 9,712,570 B1
(45) Date of Patent: Jul. 18, 2017

(54) DYNAMIC ADAPTATION TO INCREASED SFU LOAD BY DISABLING VIDEO STREAMS

(71) Applicant: Atlassian Pty Ltd, Sydney (AU)

(72) Inventors: Emil Ivov, Austin, TX (US); Boris Grozev, Austin, TX (US); Georgios Politis, Austin, TX (US)

(73) Assignee: Atlassian Pty Ltd, Sydney (AU)

( * ) Notice: Subject to any disclaimer, the term of this patent is extended or adjusted under 35 U.S.C. 154(b) by 0 days.

(21) Appl. No.: 15/279,325

(22) Filed: Sep. 28, 2016

(51) Int. Cl.
*H04L 29/06* (2006.01)
*H04L 29/08* (2006.01)
*H04L 12/803* (2013.01)
*H04L 12/927* (2013.01)
*H04N 7/15* (2006.01)

(52) U.S. Cl.
CPC ........ *H04L 65/1089* (2013.01); *H04L 47/125* (2013.01); *H04L 47/801* (2013.01); *H04L 65/403* (2013.01); *H04N 7/15* (2013.01)

(58) Field of Classification Search
CPC .................. H04L 65/1089; H04L 65/403
USPC ........ 709/204, 205, 231, 232, 242; 715/753, 715/755, 756
See application file for complete search history.

(56) References Cited

U.S. PATENT DOCUMENTS

| 7,593,032 | B2 | 9/2009 | Civanlar et al. | |
|---|---|---|---|---|
| 9,386,056 | B1* | 7/2016 | Atzmon | H04L 65/60 |
| 2011/0314394 | A1* | 12/2011 | Kilmer | H04L 12/1822 715/755 |
| 2014/0375756 | A1* | 12/2014 | Yang | H04N 7/152 348/14.09 |
| 2015/0085057 | A1* | 3/2015 | Ouyang | H04N 7/15 348/14.02 |

OTHER PUBLICATIONS

"Low Bandwidth Video Conferencing"—Flora Kundaeli, University of Cape Town, Oct. 2011 https://people.cs.uct.ac.za/~fkundaeli/LitReview.pdf.*
Eleftheriadis et al., "Multipoint Videoconferencing with Scalable Video Coding", Journal of Zhejiang University Science A, dated 2006, pp. 696-705.

* cited by examiner

*Primary Examiner* — Randy Scott
(74) *Attorney, Agent, or Firm* — Elliot H. Karlin; Hickman Palermo Becker Bingham LLP

(57) ABSTRACT

A method for dynamically adapting to increased system load at a selective forwarding unit (SFU) is disclosed. In an embodiment, an SFU sends a plurality of video streams to a plurality of participant computing devices. The SFU monitors a system load value on the SFU according to any of a plurality of metrics. When the SFU determines that the monitored system load value exceeds a stored load threshold value, the SFU selects one or more of the streams being sent to participant computing devices and disables them.

18 Claims, 4 Drawing Sheets

US 9,712,570 B1

DYNAMIC ADAPTATION TO INCREASED SFU LOAD BY DISABLING VIDEO STREAMS

TECHNICAL FIELD

The technical field of the present disclosure is computer hardware, software and systems that implement audio and video conferencing. The technical field of the disclosure also is computer hardware, software and systems that are programmed for detecting and dynamically adapting to overuse and underuse of system resources in Selective Forwarding Units (SFU).

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Video and audio calls and conferences are becoming both more common and larger in size every day. Originally, video and audio calls and conferences hosted using computers were limited to direct connections between users in which a first user called a second user, enabling the users to see and hear each other during the call. As methods improved, conferences of five, ten, or more users all with streaming video and audio became more common. Simply sending all video and audio data from each participant to every other participant in such a large conference often is not feasible due to limitations on network bandwidth in local area networks and internetworks and the limited processing power in some client devices.

In response, solutions to large video and audio conferences were implemented with server computers using two general approaches: multipoint control units (MCU) and selective forwarding units (SFU). MCUs receive and process audio and video data from clients and typically mix the audio and video to create a single composite video. The composite video is then streamed to the clients in a single mix. While this solution enables relatively simple client software, the processing power needed for the MCU is high, and the resulting presentation at the client is generally inflexible. SFUs, in contrast, are more similar to packet data routers, as SFUs forward packets without media processing.

Due to limitations on network bandwidth and processing power, SFUs may improve their efficiency by only sending a subset of the video streams to each computing device. In an extremely large video conference, sending all of the video streams to each of the computing devices in the conference would be egregious, as most of the video streams are likely unnecessary to the majority of the people in the video conference. Thus, the SFU may reduce the load on the SFU by limiting the number of video streams sent to each participant computing device in a conference.

While setting a hard limit on the number of video streams sent to each computing device in a conference effectively reduces the load on the SFU, a hard limit is not adaptable to different situations. For instance, there may be times when the load on the SFU is especially high, such as during peak conferencing hours or in the case of a particularly large conference. When the SFU begins overusing its available resources, the ability of the SFU to forward high quality videos begins to degrade. For example, when the SFU uses too much bandwidth, the SFU begins to lose packets over the network, resulting in bad video quality for all users of the SFU.

A solution to the overuse of network resources is to create stronger limits on network usage, such as by using a smaller limit on the number of video streams sent to each participant computing device in a conference. While this method would reduce the usage of network resources, it would also degrade the experience for members of the conference. In times of low system usage, each participant computing device would still be limited on the number of received video streams, even though the SFU has bandwidth to send a greater number of video streams.

Thus, there is a need for a method that allows an SFU to dynamically adapt to overuse and underuse of system resources while minimizing the negative effects on user experience.

DESCRIPTION OF EXAMPLE EMBODIMENTS

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Computer-implemented techniques are provided for dynamically adapting to changes in system load at a selective forwarding unit (SFU). Specifically, in various programmable algorithms, an SFU monitors a system load on the SFU. When the SFU determines that it is overusing available resources, the SFU selectively disables streams in a manner that reduces the system load while minimizing the negative effect on the users. In an embodiment, streams are selected such that disabling the streams reduces the system load past an overuse threshold. The streams may further be selected in a manner that reduces a participant effect value which estimates an effect on the participants of disabling the streams.

In one embodiment, a method comprises sending, from a selective forwarding unit (SFU) to each of a plurality of participant computing devices, one or more digital video streams, wherein the SFU stores identifiers of each participant computing device among the plurality of participant computing devices; monitoring, at the SFU, a system load value which estimates a load on the SFU according to any of a plurality of different load metrics; determining that the system load value exceeds a particular load threshold value and, in response, selecting a subset of the identifiers of the plurality of participant computing devices; for each participant computing device that corresponds to one of the identifiers of the subset, disabling one or more of the digital video streams that are sent to the participant computing device from the SFU.

In order to adapt to underuse, in one embodiment, the method further comprises, in response to disabling one or more of the digital video streams that are sent to the participant computing device of the subset of the plurality of participant computing devices, waiting a particular period of time; after waiting the particular period of time, determining that the system load value is below a second load threshold value and, in response, selecting one or more participant computing devices of the subset of the plurality of participant computing devices; restoring one or more of the disabled digital video streams.

Example System Implementation

Figure 1:
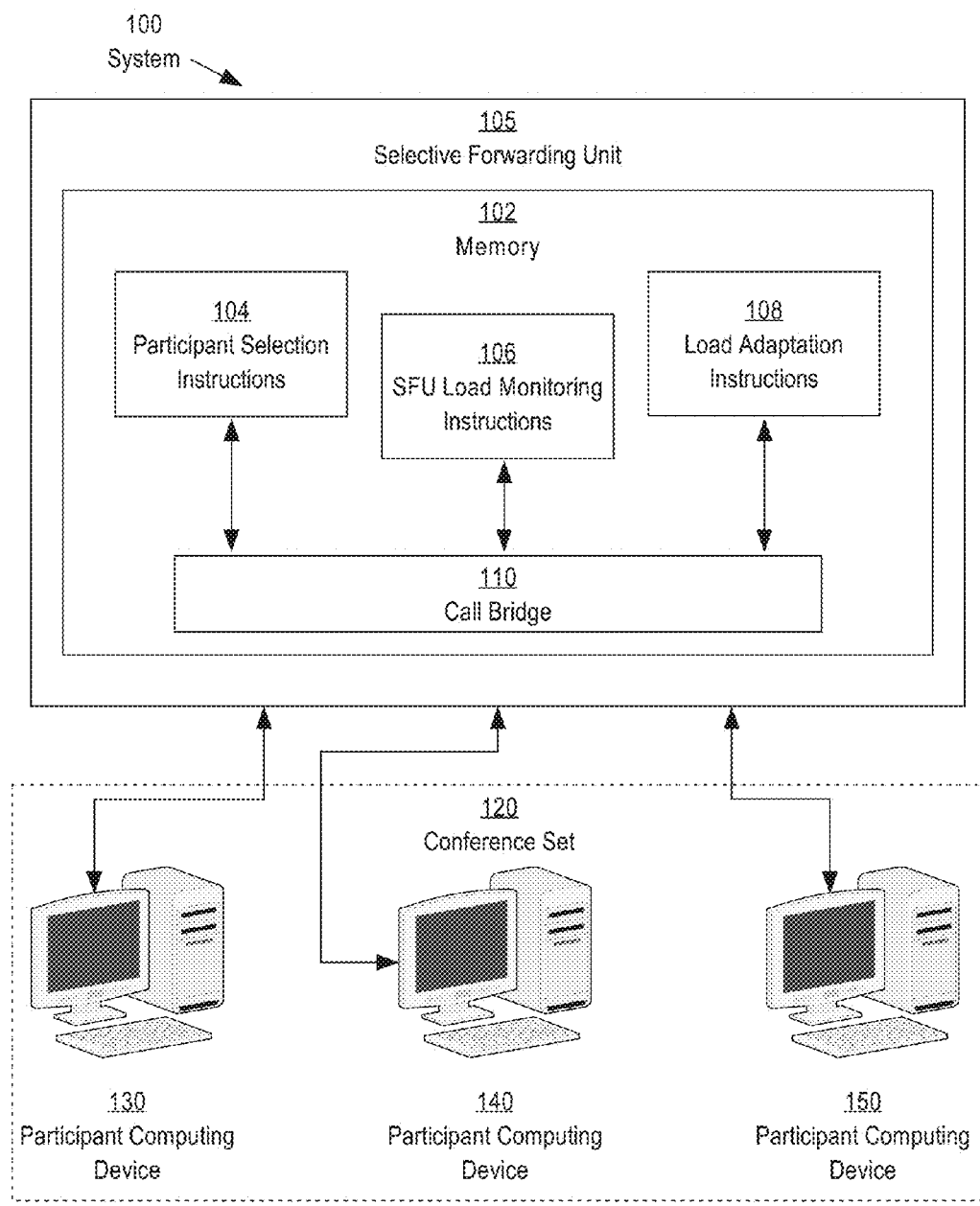
FIG. 1 illustrates an example computer system in which the techniques described may be practiced, according to one embodiment.

FIG. 1 illustrates an example computer system in which the techniques described may be practiced, according to one embodiment. In an embodiment, a computer system 100 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. System 100 illustrates only one of many possible arrangements of components configured to execute the programming described herein. Other arrangements may include fewer or different components, and the division of work between the components may vary depending on the arrangement.

System 100 includes selective forwarding unit (SFU) 105 and participant computing devices 130, 140, and 150, which may be communicatively coupled directly or indirectly to the SFU via networks. SFU 105 may be any computing device, including but not limited to: servers, racks, work stations, personal computers, general purpose computers, laptops, Internet appliances, hand-held devices, wireless devices, wired devices, portable or mobile devices, wearable computers, cellular or mobile phones, portable digital assistants (PDAs), smart phones, tablets, multi-processor systems, microprocessor-based or programmable consumer electronics, game consoles, set-top boxes, network PCs, mini-computers, virtual machines, and the like. Although FIG. 1 shows SFU 105 as a single device, SFU 105 may be multiple devices, such as a server cluster, and may be located in one or more physical locations. As discussed above, a SFU forwards audio and video packets for a conference without media processing.

SFU 105 is communicatively connected to client devices 130, 140 and 150 through any kind of computer network using any combination of wired and wireless communication, including, but not limited to: a Local Area Network (LAN), a Wide Area Network (WAN), the Internet, a company network, etc. SFU 105 may include applications, software, and other executable instructions to facilitate various aspects of embodiments described herein. In one embodiment call bridge 110 comprises program instructions that are configured to receive RTP packets, select participants for load adaptation, monitor the load of the SFU, disable streams being sent to one or more participant computing devices, determine bit-rates for particular streams, selectively forward RTP packets based on a variety of factors, and any other functions needed to implement the present disclosure. In one embodiment, SFU 105 comprises participant selection instructions 104, SFU load monitoring instructions 106, and load adaptation instructions 108, each coupled to a call bridge 110. The participant selection instructions 104, SFU load monitoring instructions 106, and load adaptation instructions 108 are stored within electronic digital storage as indicated by main memory 102. Each of the participant selection instructions 104, SFU load monitoring instructions 106, and load adaptation instructions 108 may comprise programmed machine executable instructions that are configured or programmed to implement and execute the algorithms that are further described herein, including in the flow diagrams and the text relating to those diagrams. In various embodiments, the participant selection instructions 104, SFU load monitoring instructions 106, and load adaptation instructions 108 may be created and stored using a human-readable source code language and using a program development environment including but not limited to JAVA, OBJECTIVE-C, C++, C and the like.

In one embodiment, call bridge 110 comprises program instructions such as participant selection instructions 104 that may be stored digitally in memory and configured to, when executed by one or more processors, cause call bridge 110 to identify particular participant computing devices or particular groups of computing devices for load adaptation. Specifically, in embodiments where participant computing devices are receiving a plurality of streams, execution of participant selection instructions 104 may cause the call bridge 110 to identify participant computing devices which are receiving a plurality of streams and reduce the number of streams for the participant computing devices.

In one embodiment, call bridge 110 comprises program instructions such as SFU load monitoring instructions 106 that may be stored digitally in memory and configured to, when executed by one or more processors, cause call bridge 110 to measure a load on the SFU and determine whether the load on the SFU is outside specified parameters. Specifically, executing SFU load monitoring instructions 106 may cause the call bridge 110 to determine whether a load on the SFU is greater than a particular overuse threshold. Additionally, executing SFU load monitoring instructions may cause the call bridge 110 to determine whether a load on the SFU is less than a particular underuse threshold.

In one embodiment, call bridge 110 comprises program instructions such as load adaptation instructions 108 that may be stored digitally in memory and configured to, when executed by one or more processors, cause call bridge 110 to alter outgoing streams to participants in order to balance the load on SFU 105. Specifically, executing the load adaptation instructions 108 may cause call bridge 110 to selectively decrease a number of outgoing streams and/or selectively lower the quality of outgoing streams in response to a determination that a load on the SFU is greater than the particular overuse threshold. Additionally, executing load adaptation instructions 108 may cause call bridge 110 to selectively increase a number of outgoing streams and/or selectively increase the quality of outgoing streams in response to a determination that a load on the SFU is lower that the particular underuse threshold.

For purposes of illustrating a clear example, FIG. 1 shows three participant computing devices 130, 140, 150, but in other embodiments, any number of client devices may be used and the embodiments herein specifically contemplate interoperation with thousands or millions of client devices with dozens or more client devices participating in any one audio conference or video conference. In one embodiment, the participant computing devices 130, 140, 150 are computing devices, including but not limited to: work stations, personal computers, general purpose computers, laptops, Internet appliances, hand-held devices, wireless devices, wired devices, portable or mobile devices, wearable computers, cellular or mobile phones, portable digital assistants (PDAs), smart phones, tablets, multi-processor systems, microprocessor-based or programmable consumer electronics, game consoles, set-top boxes, network PCs, minicomputers, servers, racks, and the like.

Participant computing devices 130, 140, 150 are communicatively connected to SFU 105 using any combination of wired and wireless communication as represented by the arrows in FIG. 1, including, but not limited to: a Local Area Network (LAN), a Wide Area Network (WAN), the Internet, a company network, etc. Participant computing devices 130, 140, 150 may include applications, software, and other executable instructions to facilitate various aspects of embodiments described herein. Specifically, participant computing devices 130, 140, 150 may include client software that is programmed to support video conferencing or audio conferencing. The software may be standalone, may be implemented through a web browser using browser-executable code, or any other suitable application.

In an embodiment, each of participant computing devices 130, 140, 150 are part of conference set 120. A conference set, as used herein, refers to a plurality of computing devices which are identified as participating in the same conference. Video and audio streams received from participant computing devices of the same conference may be forwarded to other participant computing devices of the same conference. Different participant computing devices in a conference set may receive different video and audio streams. For example, a user of a first participant computing device may request a video feed from a different participant computing device of a conference set than a user of a second participant computing device. Thus, while both computing devices receive video streams from other computing devices in the conference set, the received video streams may differ. Additionally, a particular participant computing device may not receive video and/or audio streams that the particular participant computing device sends to SFU 105.

In an embodiment, one or more participant computing devices of conference set 120 receive a plurality of video and/or audio streams. For example, SFU 105 may forward video and audio streams from multiple computing devices of the conference set to a single computing device of the conference set. In a video conference setting, this allows a participant computing device to display multiple video and/or audio streams from a video conference where multiple participant computing devices are generating and forwarding video and audio simultaneously. While some participant computing devices may receive a plurality of video and/or audio streams, other participant computing devices may receive one or zero video and/or audio streams.

SFU 105 may be programmed or configured to identify a subset of received video and/or audio streams that SFU 105 receives from devices in a particular conference set to send to other participant computing devices in the conference set. For example, SFU 105 may, for each conference set, store a maximum stream value indicating a maximum number of streams to send to each computing device of the conference set. Thus, if a particular conference set includes thirty participant computing devices but the maximum number of streams for the particular conference set is five, then each participant computing device may receive a maximum of five streams from SFU 105.

SFU 105 may select the subset of streams from the plurality of streams received from the participant computing devices of the particular conference set to send to each participant computing device based on one or more factors. Factors may include selection by participant computing devices and/or audio levels of the received streams. For example, SFU 105 may be configured to identify five streams each of which forwarded higher than average audio levels for that stream more recently than the remaining streams. Thus, streams that included the most recent speakers may be forwarded to participant computing devices of a particular conference set. As different streams are selected to be included in the subset of streams, SFU may remove streams being sent to participant computing devices and replace them with the newly selected streams. For example, if a particular participant computing device is selected for the subset due to a monologue of a participant, SFU 105 may send streams from that particular participant computing device to other participant computing devices of the conference set. If after a period of time, five other participant computing devices are selected to be in the subset, then SFU 105 may stop sending streams from the particular participant computing device in favor of the five other participant computing devices.

In an embodiment, each participant computing device may additionally store a maximum stream value indicating a maximum number of streams that the participant computing device may receive. For example, a first participant computing device may have greater capabilities than a second participant computing device. Thus, the first participant computing device may be capable of receiving more video streams than the second participant computing device. The stored maximum values may change over time. For example, a particular participant computing device may monitor its internal CPU load and increase or decrease the stored maximum stream value based on the internal CPU load. Each participant computing device may send the stored value indicating the maximum number of streams that the participant computing device may receive to SFU 105. SFU 105 may select, for each participant computing device, a number of streams to send to the participant computing device that is less than or equal to the lesser of the SFU's maximum stream value and the participant computing device's maximum stream value.

Load Adaptation

Figure 2:
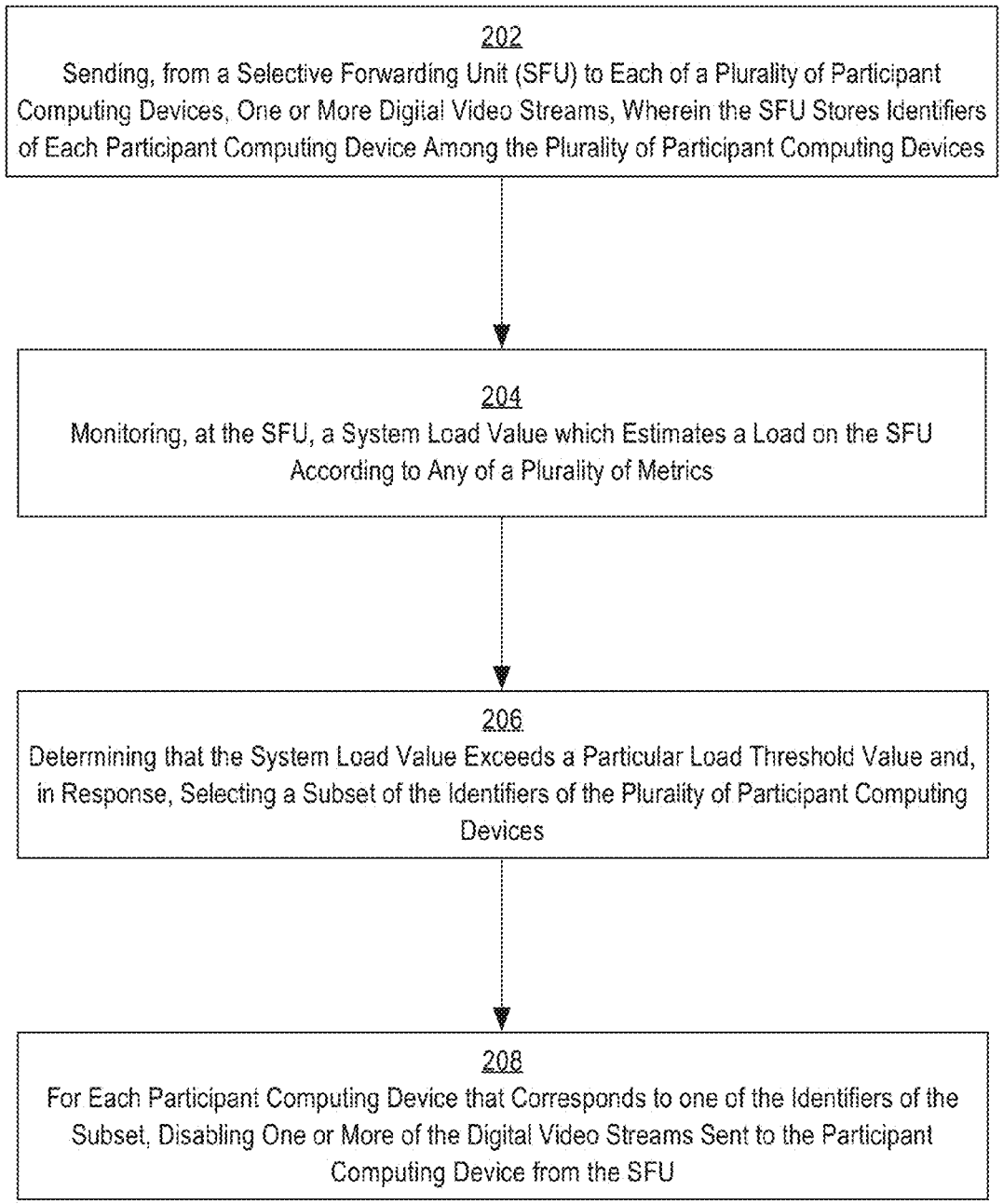
FIG. 2 illustrates a programmable algorithm or method in accordance with an embodiment.

FIG. 2 illustrates a programmable algorithm or method in accordance with an embodiment. FIG. 2 is intended to describe an algorithm that could be programmed in the system described above at the same level of detail that persons of skill in the art to which this invention pertains will normally use to communicate among themselves with respect to other algorithms, methods, program plans and the like. Persons of this level of skill are accustomed to communicating at the level of FIG. 2 and possess the education, information and skill that can be applied to FIG. 2 to result in completing computer programs that execute to practice the functions shown in FIG. 2 and further described herein.

At step 202, one or more video streams are sent to each of a plurality of participant computing devices from a selective forwarding unit (SFU). The SFU stores identifiers of each participant computing device among the plurality of participant computing devices. For example, a plurality of participant computing devices in a particular conference set may each send video streams to the SFU. The SFU may then, for one or more participant computing devices in the conference set, select a subset of the received video streams to forward to the participant computing device.

SFU 105 may store, for each participant computing device, an identifier of the participant computing device, such as a username. SFU 105 may also store conference set identifiers which identify particular groupings of participant computing devices that are participating in a particular conference. For example, a particular conference set identifier may be associated with a plurality participant computing device identifiers in memory of SFU 105. Additionally, SFU 105 may store data which identifies, for each identifier of a participant computing device, a number of streams received by the participant computing device, a quality of streams received by the participant computing device, and/or one or more capabilities of the participant computing device.

At step 204, a system load value which estimates a load on the SFU according to any of a plurality of metrics is monitored at the SFU. The system load value may be any of network utilization, CPU usage, outgoing bitrate, physical memory usage, other metrics for measuring load on a system, and/or any combination of the aforementioned metrics. For example, SFU 105 may monitor both the CPU usage of SFU 105 and the bandwidth usage of SFU 105 to determine if either value exceeds preset limits. In some embodiment, to monitor the metrics, the SFU 105 may retrieve data from stored sources, such as simple network management protocol (SNMP) management information base (MIB) objects. Alternatively, one program or method that implements part of FIG. 2 may send a programmatic call or request to another method, object or program to retrieve metrics that a separate thread or process is monitoring. The specific method of monitoring load metrics is not critical.

At step 206, a determination is made that the system load value exceeds a particular load threshold value and, in response, a subset of the identifiers of the plurality of participant computing devices is selected. SFU 105 may store, in memory or persistent storage, an overuse load threshold value for the monitored system load value which identifies a value above which SFU 105 determines that SFU 105 is overusing available resources. For example, an overuse load threshold value for network utilization, measured as average egress bitrate on the server over the last five seconds, may be set to 200 Mbps. Thus, if the average egress bitrate on the server over the last five seconds exceeds 200 Mbps, SFU 105 may determine that the system is overusing resources.

The overuse load threshold value may also comprise a percentage of available resources that are being used by SFU 105. For example, SFU 105 may be programmed or configured to monitor a percentage of available CPU being used as the system load value. The overuse load threshold value may be set as a particular percentage of the available CPU, such as 90%. If SFU 105 determines that more than 90% of the available CPU is being used, SFU 105 may determine that the system load value exceeds the threshold. By setting the overuse load threshold value at a percentage of available resources, the system and method described herein may be implemented on different SFUs with different capabilities without the setting of new thresholds based on those capabilities. Additionally and/or alternatively, the overuse load thresholds may be calculated dynamically, such as through estimations of the effects on the CPU of a current CPU load. For example, the overuse load threshold may be computed based on a total number of dropped packets over a particular period of time.

SFU 105 may be programmed or configured to select the subset of the plurality of participant computing devices such that disabling one or more streams for the subset of the plurality of participant computing devices would cause the system load value to decrease past a particular value. For example, if each stream includes a constant bitrate of 2 Mbps, in order to lower the system load value by 20 Mbps, SFU 105 may select participant computing devices to be part of the subset such that ten streams total are disabled.

SFU 105 may be programmed or configured to reduce the system load value below the overuse load threshold value. Thus, in an embodiment, the particular value is the overuse load threshold value. In other embodiments, the particular value is a value below the overuse load threshold value. For example, if the overuse load threshold value is 200 Mbps, SFU 105 may be programmed or configured to select the subset such that disabling the streams for the subset brings the system load value below 200 Mbps, the overuse load threshold, or below a safety value, such as 190 Mbps.

In an embodiment, SFU 105 selects the subset of the plurality of participant computing devices such that disabling streams for the subset of the plurality of participant computing devices minimizes a participant effect value. The participant effect value, as used herein, refers to an estimated effect on the participant computing devices of disabling one or more streams for the participant computing devices. For example, for each participant computing device, an effect on the participant computing device of disabling x streams may be computed as x/n where n is the total number of streams being received by the participant computing device. Thus, if a participant computing device is receiving five streams, the effect on the participant computing device of disabling one of the five streams would be ⅕. The participant effect value may comprise a summation of the individual effects on the participant computing devices.

In an embodiment, SFU 105 uses mathematical minimization techniques to identify the subset of the plurality of participant computing devices such that the system load value is decreased below the overuse load threshold value while minimizing the participant effect value. In simple scenarios where all streams are assumed to comprise the same bitrate, selecting the subset of participant computing devices may comprise selecting the participant computing devices with the highest number of streams, thereby minimizing the participant effect value for the same decrease in the system load value.

In more complex situations, where different streams comprise different bitrates, SFU may perform more complex minimizations. For example, if a first participant computing device receives five streams at 3 Mbps and a second participant computing device receives four streams at 4 Mbps, selecting the second participant computing device instead of the first participant computing device would increase the effect on the system load value, but at the cost of increasing the participant effect value. Thus a selection of the second participant computing device over the first may depend on the overuse load threshold value, the bitrates of streams of other participant computing devices, and/or the number of streams of the other participant computing devices.

In an embodiment, an equation for selecting a subset, A, of the participant computing devices of SFU 105, B, comprises:

$$A(P(r, n), x) \subseteq B(P) \left\| \begin{pmatrix} \sum_{i}^{|A|} r_i x_i \geq L - T_L \\ \min\left(\sum_{i}^{|A|} \frac{x_i}{n_i}\right) \end{pmatrix} \right\|$$

where $P_i$ ($r_i$, $n_i$) is a participant computing device receiving $n_i$ streams with a bitrate of $r_i$ and being selected to have $x_i$ streams disabled. L is the current system load value and $T_L$ is the overuse load threshold value. |A| is the number of selected participant computing devices in the subset A.

Conference Set Maximum Stream Values

In an embodiment, SFU 105 selects the subset of participant computing devices by selecting particular conference sets and lowering the maximum stream value for the conference set. SFU 105 may compute, for each conference set, a participant effect value and an effect on the system load value based on a reduction of the maximum stream value for the conference set. SFU 105 may select conference sets for lowering a maximum stream value by a particular number of streams such that the system load value is reduced past the particular value and the aggregated participant effect value is minimized.

Figure 3:
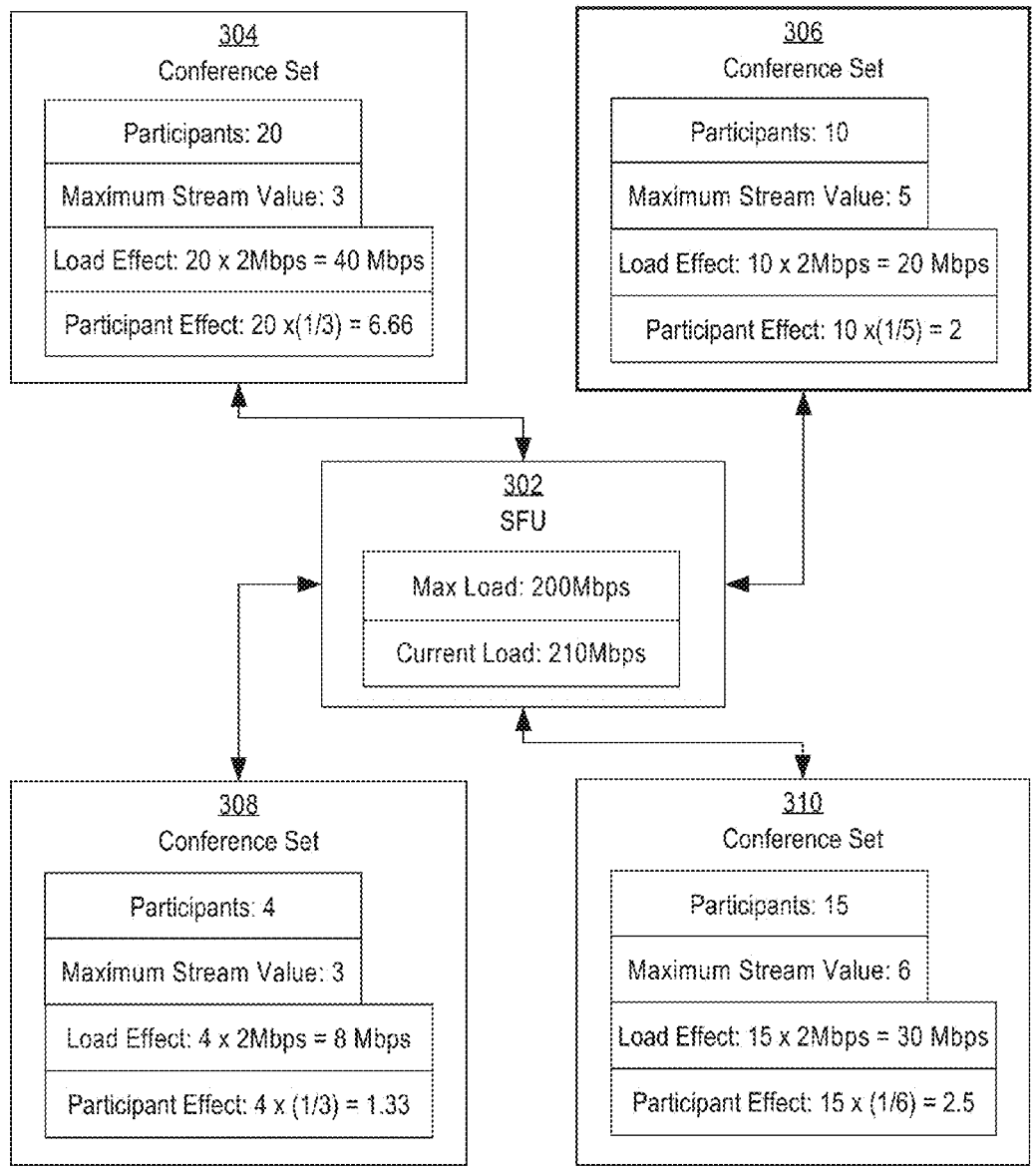
FIG. 3 illustrates an example implementation of selecting participant computing devices by selecting one or more conference sets and reducing the maximum stream value for the selected conference sets.

FIG. 3 illustrates an example implementation of selecting participant computing devices by selecting one or more conference sets and reducing the maximum stream value for the selected conference sets. The example illustrated in FIG. 3 depicts the lowering of a maximum stream value for a conference set by one. In an embodiment, an SFU may be configured to lower the maximum stream value for a conference by a different value, based, at least in part, on an effect on the user and/or the current system load.

FIG. 3 includes SFU 302 communicatively coupled to conference sets 304, 306, 308, and 310. SFU 302 has a maximum overuse load threshold value of 200 Mbps and a current system load value of 210 Mbps. Thus, SFU 302 will attempt to identify one or more conference sets that reduce the current system load value by 10 Mbps or more while minimizing a participant effect value. In the example of FIG. 3, each stream is assumed to be a constant bitrate of 2 Mbps for the purpose of simplicity. In more complex embodiments, the load effect and participant effect value for each conference are computed as sums of individual load effects and participant effect values for each participant computing device affected.

Of the conference sets in FIG. 3, lowering the maximum stream value for conference set 306 generates the lowest participant effect value of 2 while decreasing the current load past the maximum load. Therefore, in the example of FIG. 3, SFU 302 would select conference set 306 to have the maximum stream value lowered.

Conference set 304 contains 20 participants and has a maximum stream value of 3. Thus, at a constant bitrate of 2 Mbps per stream, the load effect is 40 Mbps while the participant effect is 6.66. While the load effect satisfies the first requirement, that the load effect is 10 Mpbs or greater, the participant effect of 6.66 is higher for conference set 304 than any of the other conference sets.

Conference set 308 has the lowest participant effect, but the load effect of 8 Mbps is lower than 10 Mbps. While conference set 308 could be combined with a different conference set to reach the 10 Mbps load reduction, no combination with the available remaining conference sets of FIG. 3 would minimize the participant effect value. If SFU 105 lowered the maximum stream value for conference set 308 by two, the load effect would be doubled to 16 Mbps, which would decrease the current load past the maximum load. The participant effect of decreasing the maximum stream value for conference set 308 by two would be 4×(⅔), or 2.66. As the participant effect of decreasing the maximum stream value for conference set 308 by two is greater than the participant effect of decreasing the maximum stream value for conference set 306 by one, SFU 302 would not select conference set 308 over conference set 306.

Conference set 310 has the highest maximum stream value of the conference sets in FIG. 3. In embodiments where participant computing devices are selected individually, SFU 302 would select either five or six of the participant computing devices in conference set 310 in order to minimize the participant effect value. In embodiments where the maximum stream value is lowered by conference set, the larger number of participants in conference set 310 causes the participant effect value to be higher than the participant effect value for conference set 306.

The implementation depicted in FIG. 3 assumes that each participant is receiving the maximum number of streams. In embodiments, a participant computing devices in a conference set can store a maximum stream value for itself which is lower than the current maximum stream value for the conference set. Thus, in order to determine the load effect and the participant effect values, SFU 302 may first determine how many participant computing devices would be affected by reducing the maximum stream value for the conference. As an example, if, in FIG. 3, only four of the participants of conference set 306 were receiving five streams, then the load effect of lowering the maximum stream value of only conference set 306 by one would not be large enough to reduce the current system load value to the overuse load threshold value. Thus, for each conference set, SFU 302 may be configured to compute the actual load effect and participant effect values when the maximum stream value is lowered for the conference set based on a subset of the participant computing devices of the conference set that would be affected by the lowered maximum stream value.

Referring again to FIG. 2, at step 208, for each participant computing device that correspond to one of the identifiers of the subset, one or more of the digital video streams sent to the participant computing device from the SFU are disabled. In an embodiment, disabling the one or more of the digital video streams sent to the selected participant computing devices comprises reducing the number of streams sent to the participant computing device. Thus, if a particular selected participant computing device originally received five streams and was selected to have one stream disabled, the SFU may stop sending one of the five streams to the selected participant computing device.

The disabled stream may be selected based on a rating of importance of the streams sent to the participant computing device. For example, in embodiments where the streams sent to a participant computing device comprise the most recent streams which contained above average audio levels, the least recent of the streams to contain above average audio levels may be dropped.

Replacing High Quality Streams with Low Quality Streams

In an embodiment, SFU 302 performs the methods for load adaptation by disabling one or more streams in favor of lower quality streams. Thus, instead of and/or in addition to reducing the number of streams received by a participant computing device, SFU 302 may replace a high quality stream with a lower quality stream. For example, the high quality stream may be a stream with a first bitrate while the low quality stream may be a stream with a second bitrate which is lower than the first bitrate. The lower bitrate may be achieved through a decrease in spatial resolution, a decrease in temporal resolution, and/or a decrease in the quality of the video signal.

In an embodiment, both the high quality stream and the low quality stream are sent to SFU 105 simultaneously. For example, SFU 105 may receive simultaneous broadcast (simulcast) streams from one or more of the participant computing devices. For the received simulcast streams, SFU 105 may send the higher quality streams to one or more participant computing devices. SFU 105 may select one or more of the participant computing devices that are receiving the higher quality streams of the simulcast streams in response to determining that the system load value exceeds the particular threshold. For the selected participant computing devices, SFU 105 may disable the one or more streams by stopping the forwarding of the higher quality stream of the simulcast streams to the selected participant computing devices and starting forwarding of the lower quality streams of the simulcast streams to the selected participant computing devices.

In an embodiment, the high quality stream is compressed using scalable video coding such that the high quality stream contains one or more subset streams. Scalable video coding allows SFU 105 to replace the higher quality stream with the lower quality stream by dropping packets from the transmitted stream. SFU 105 may select one or more of the participant computing devices using the methods described herein. For each of the selected participant computing devices, SFU 105 may disable the high quality stream by dropping one or more packets from a stream compressed with scalable video coding such that the remaining stream is of a lower quality.

For each high quality stream, SFU 105 may identify an expected decrease in load from replacing the high quality stream with a lower quality stream. For example, if the high quality stream is sent at 4 Mbps and the low quality stream would be sent at 2 Mbps, the expected decrease in load would be 4 Mbps−2 Mbps=2 Mbps. As both the high quality and low quality bitrates may differ between participant computing devices, the expected decrease in load may also differ between computing devices.

In an embodiment, SFU 105 orders streams by expected decrease in load for switching between a high quality version of the stream and a lower quality version of the stream. SFU 105 may then select streams in descending order, starting with the highest expected decrease in load and continuing until the expected decrease in load is higher than the difference between the current load and a particular value, such as the overuse load threshold value. By selecting streams with the highest expected decrease in load, SFU 105 minimizes the number of streams affected.

SFU 105 may also compute a participant effect value for replacing high quality streams with low quality streams. In an embodiment, the participant effect value for each participant computing device comprises the quotient of the number of streams affected and the total number of streams. In additional embodiments, the participant effect value includes a value pertaining to the difference between the high quality stream and the low quality stream. For example, the participant effect value may be computed as:

$$\frac{x \cdot q}{n}$$

where x is the number of streams affected for the participant computing device, n is the total number of streams received by the participant computing device, and q is the difference in quality between the high quality stream and the low quality stream.

Values for q may be normalized depending on the metric used to define the difference in streams. For example, if the difference between the higher quality stream and the lower quality stream is the spatial resolution, then q may be computed as $$q = 1 + C\frac{p_h - p_l}{p_h}$$

where $p_h$ is the pixel count of the higher resolution stream, $p_l$ is the pixel count of the lower resolution stream, and C is a normalization constant which is configurable to increase or decrease the effect of larger changes in resolution. Values for q may be normalized in similar ways for differences in temporal resolution and differences in video signal quality.

Additionally and/or alternatively to the difference between the streams, the participant effect value may comprise a weighting for each stream based, at least in part, on an identified importance of the stream. For example, where streams are selected to be sent to participant computing devices based on how recently the stream included greater than average audio levels, a first forwarded stream which included greater than average audio levels most recently would have a higher identified importance than a second forwarded stream which included greater than average audio levels least recently. Thus, the first forwarded stream may comprise a higher weighting than the second forwarded stream. Using the weightings, the participant effect value for replacing a particular high quality stream with a low quality stream may be computed as $$\frac{x \cdot w}{n}$$

or $$\frac{x \cdot q \cdot w}{n}$$

where w is a computed weight based on importance of the stream.

In an embodiment, SFU 105 uses minimization techniques as described herein to minimize the participant effect value while ensuring load reduction past the particular load value. Additionally and/or alternatively, SFU 105 may order streams by the ratio between load reduction and participant effect value. SFU 105 may select streams with the highest ratio between load reduction and participant effect value until the expected decrease in load is higher than the difference between the current load and a particular value, such as the overuse load threshold value.

In an embodiment, SFU 105 lowers stream quality for particular conference sets. SFU 105 may compute estimated load reduction for each conference set for replacing each high quality stream with a low quality stream and/or for replacing a particular number of high quality streams for each participant computing device with a low quality stream. In an embodiment, SFU 105 stores a maximum stream value and a maximum high quality stream value for a conference. Instead of reducing the maximum stream value which would remove streams for some participants, SFU 105 may reduce the maximum high quality stream value for the conference, thereby reducing the quality in streams for some participants without removing the streams.

SFU 105 may select conferences for quality reduction using similar techniques as selecting individual participant computing devices. For example, SFU 105 may order conference sets by load reduction and select conferences with the highest load reduction until the expected decrease in load is higher than the difference between the current load and the particular value. Additionally and/or alternatively, SFU 105 may compute participant effect values for conference sets and select the conference sets that minimize the participant effect value while reducing the load on SFU 105 until the expected decrease in load is higher than the difference between the current load and the particular value.

Restoring Streams

In an embodiment, SFU 105 stores an underuse threshold value which identifies a value below which SFU 105 determines that SFU 105 is underusing available resources. For example, an underuse load threshold value for network utilization, measured as average egress bitrate on the server over the last five seconds, may be set to 180 Mbps. Thus, if the average egress bitrate on the server over the last five seconds is below 180 Mbps, SFU 105 may determine that the system is underusing resources.

After disabling the one or more streams, SFU 105 may be programmed or configured to wait a particular period of time before monitoring the load to determine whether the system load value is still above the overuse load threshold value or whether the system load value has dropped below the underuse load threshold value. The particular period of time may be selected to be long enough for the system load value to change based on the disabling of the one or more streams. If, after the particular period of time, the system load value still exceeds the overuse load threshold value, SFU 105 may use the techniques described herein to select one or more participant computing devices to have one or more streams disabled. If, after the particular period of time, SFU 105 determines that the system load value is between the underuse load threshold value and the overuse load threshold value, SFU 105 may continue monitoring the system load value.

In response to determining that the current load value is below the underuse load threshold value, SFU 105 may select one or more of the disabled streams to be restored. In embodiments where SFU 105 stops sending one or more streams to participant computing devices, restoring the streams may comprise starting sending the one or more of the disabled streams to the participant computing devices. In embodiments where SFU 105 replaces high quality streams with low quality streams, restoring the streams may comprise replacing the low quality streams with the previously sent high quality streams.

In an embodiment, SFU 105 selects a subset of the disabled streams to be restored. SFU 105 may select streams to restore such that the expected load value after restoring the streams is greater than the underuse threshold value but less than the overuse threshold value. For example, SFU 105 may identify the expected increase in load of restoring streams for each participant computing device. SFU may select streams with the lowest expected increase in load to restore until the expected increase in load surpasses the underuse threshold value.

In an embodiment, SFU 105 may be programmed or configured to restore as many streams as possible while keeping the expected increase in load from causing the load to increase past the overuse threshold or a preconfigured intermediary value. The intermediary value may be set to decrease the probability that restoring streams causes SFU 105 to overuse resources. For example, if the overuse threshold value is 200 Mbps and the underuse threshold value is 180 Mbps, an intermediary threshold value may be set to 190 Mbps such that SFU 105 only restores streams that are selected to cause the expected load to not surpass 190 Mbps. Thus, if the actual increase in load of restoring the streams is slightly higher than expected, SFU 105 may still not exceed the overuse threshold value.

In an embodiment, SFU 105 may maximize a participant benefit value while limiting the expected load value after restoring the streams to less than the overuse threshold or a preconfigured intermediary value. The participant benefit value for restoring streams may be computed as $$\frac{x}{n+x}$$

where x is the number of streams restored and n is the current number of streams being received by the participant computing device and/or the current number of high quality streams being received by the participant computing device. Additionally and/or alternatively, in embodiments where restoring streams comprises re-enabling high quality streams, SFU 105 may be programmed or configured to compute the participant benefit score by factoring in differences in quality and/or weightings based on importance of streams being restored.

SFU 105 may also be programmed or configured to restore streams by conference set. For example, SFU 105 may compute, for each conference set, the expected increase in load of raising the maximum stream value for the conference set. SFU 105 may then restore streams for participant computing devices in conference sets with the lowest expected increase in load from raising the maximum stream value. Additionally and/or alternatively, SFU 105 may compute the participant effect value for each conference set and raise the maximum stream value for the conference sets that maximize participant effect value without causing the expected increase in load to exceed the difference between the overuse load threshold value or the intermediary value and the current system load value.

After restoring streams, SFU 105 may be programmed or configured to wait a particular period of time before monitoring the load to determine whether the system load value is still below the underuse load threshold value or has exceeded the overuse load threshold value. If the system load value is between the underuse load threshold value and the overuse load threshold value, SFU 105 may continue to monitor the current load until the system load value drops below the underuse load threshold value or exceeds the overuse load threshold value. If at any point the system load value is below the underuse load threshold value, SFU 105 may select more streams to re-enable. If the system load value is above the overuse load threshold value, SFU 105 may select participant computing devices to have one or more streams disabled.

Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and program logic to implement the techniques.

Figure 4:
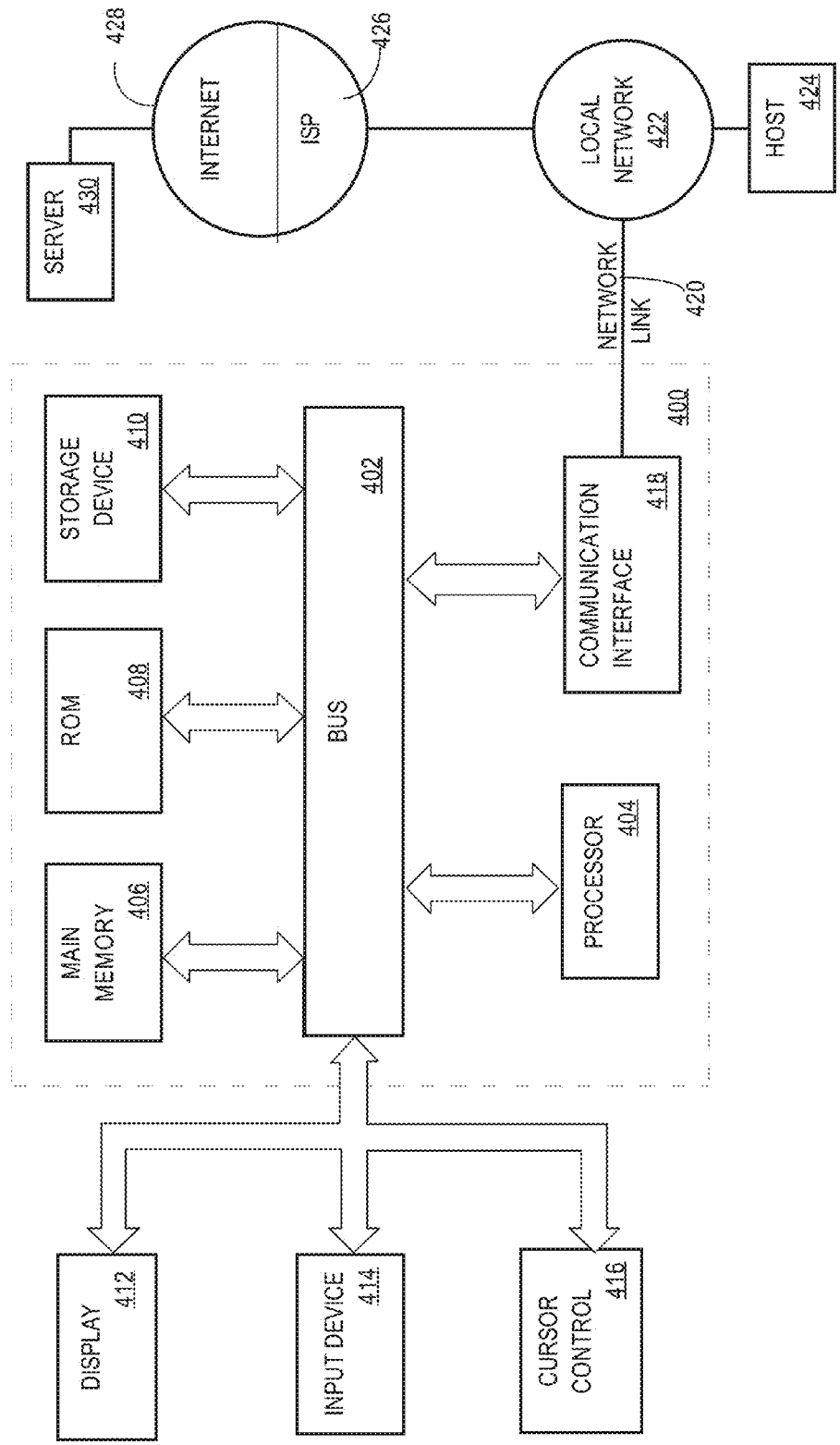
FIG. 4 illustrates a computer system upon which an embodiment may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and instructions that cause a machine to operation in a specific fashion. Such storage media may comprise non-volatile media and volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and stored in storage device 410, or other non-volatile storage for later execution.

Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    sending, from a selective forwarding unit (SFU) to each of a plurality of participant computing devices, one or more digital video streams, wherein the SFU stores identifiers of each participant computing device among the plurality of participant computing devices;
    monitoring, at the SFU, a system load value which estimates a load on the SFU according to any of a plurality of different load metrics;
    determining that the system load value exceeds a particular load threshold value and, in response, selecting a subset of the identifiers of the plurality of participant computing devices by:
        identifying, for each participant computing device of the subset of the plurality of participant computing devices, a particular number of the one or more digital video streams to disable for the participant computing device;
        computing a load effect value which estimates an effect on the load of the SFU of disabling the one or more of the digital video streams that are sent to the participant computing device from the SFU, for each participant computing device;
        computing a difference between a current system load value and the load effect value;
        determining that the computed difference does not exceed the particular load threshold value, and in response, selecting the subset of the plurality of participant computing devices based, at least in part, on determining that the computed difference does not exceed the particular load threshold value;
    for each participant computing device that corresponds to one of the identifiers of the subset, disabling one or more of the digital video streams that are sent to the participant computing device from the SFU.

2. The method of claim 1, further comprising, after disabling the one or more of the digital video streams that are sent to the participant computing device, sending a reduced number of the digital video streams to that participant computing device.

3. The method of claim 1, wherein the one or more of the digital video streams comprise digital video streams of a first quality; the method further comprising replacing the one or more of the digital video streams with one or more digital video streams comprising digital video streams of a second quality, wherein the second quality is lower than the first quality.

4. The method of claim 1, further comprising monitoring the system load value based on network utilization of the SFU, measured as an average egress bitrate on the SFU over a particular period of time.

5. The method of claim 1, further comprising monitoring the system load value based on CPU usage of the SFU.

6. The method of claim 1, further comprising:
    computing an aggregated participant effect value which estimates a total effect on participant experience of participants of the subset of the plurality of participant computing devices;
    identifying each participant computing device of the subset of the plurality of participant computing devices and a particular number of the one or more digital video streams to disable such that the computed difference between the current system load value and the load effect value does not exceed the particular load threshold and such that the aggregated participant effect value is minimized.

7. The method of claim 6, further comprising computing the aggregated participant effect value by:
    for each participant computing device, computing an individual participant effect value by dividing the particular number for the participant computing device by a current total number of video streams for the participant computing device;
    computing the aggregated participant effect value as a summation of the individual participant effect values for each participant computing device.

8. The method of claim 1, further comprising:
    in response to disabling one or more of the digital video streams that are sent to the participant computing device of the subset of the plurality of participant computing devices, waiting a particular period of time;
    after waiting the particular period of time, determining that the system load value is below a second load threshold value and, in response, selecting one or more participant computing devices of the subset of the plurality of participant computing devices;
    restoring one or more of the disabled digital video streams.

9. The method of claim 1, wherein the plurality of participant computing devices comprises conference sets of participant computing devices, and the method further comprising selecting the subset of the plurality of participant computing devices by:
    selecting one or more of the conference sets of participant computing devices;
    lowering a maximum stream number for the selected one or more of the conference sets;
    for each participant computing device in the subset of the plurality of participant computing devices, determining that a number of the one or more digital video streams sent to the participant computing device exceeds the maximum stream number for a particular conference set of the selected one or more of the conference sets which includes the participant computing device.

10. A system comprising:
    a selective forwarding unit (SFU) comprising a memory, one or more processors, and one or more instructions stored in the memory which, when executed by the one or more processors, cause:

sending, from the SFU to each of a plurality of participant computing devices, one or more digital video streams, wherein the SFU stores identifiers of each participant computing device among the plurality of participant computing devices;

monitoring, at the SFU, a system load value which estimates a load on the SFU according to any of a plurality of different load metrics;

determining that the system load value exceeds a particular load threshold value and, in response, selecting a subset of the identifiers of the plurality of participant computing devices by:

identifying, for each participant computing device of the subset of the plurality of participant computing devices, a particular number of the one or more digital video streams to disable for the participant computing device;

computing a load effect value which estimates an effect on the load of the SFU of disabling the one or more of the digital video streams that are sent to the participant computing device from the SFU, for each participant computing device;

computing a difference between a current system load value and the load effect value;

determining that the computed difference does not exceed the particular load threshold value, and in response, selecting the subset of the plurality of participant computing devices based, at least in part, on determining that the computed difference does not exceed the particular load threshold value;

for each participant computing device that corresponds to one of the identifiers of the subset, disabling one or more of the digital video streams that are sent to the participant computing device from the SFU.

11. The SFU of claim 10, wherein the one or more instruction, when executed by the one or more processors, further cause, after disabling the one or more of the digital video streams that are sent to the participant computing device, sending a reduced number of the digital video streams to that participant computing device.

12. The SFU of claim 10, wherein the one or more of the digital video streams comprise digital video streams of a first quality; wherein the one or more instruction, when executed by the one or more processors, further cause replacing the one or more of the digital video streams with one or more digital video streams comprising digital video streams of a second quality, wherein the second quality is lower than the first quality.

13. The SFU of claim 10, wherein the one or more instruction, when executed by the one or more processors, further cause monitoring the system load value based on network utilization of the SFU, measured as an average egress bitrate on the SFU over a particular period of time.

14. The SFU of claim 10, wherein the one or more instruction, when executed by the one or more processors, further cause monitoring the system load value based on CPU usage of the SFU.

15. The SFU of claim 10, wherein the one or more instruction, when executed by the one or more processors, further cause:

computing an aggregated participant effect value which estimates a total effect on participant experience of participants of the subset of the plurality of participant computing devices;

identifying each participant computing device of the subset of the plurality of participant computing devices and a particular number of the one or more digital video streams to disable such that the computed difference between the current system load value and the load effect value does not exceed the particular load threshold and such that the aggregated participant effect value is minimized.

16. The SFU of claim 15, wherein the one or more instruction, when executed by the one or more processors, further cause computing the aggregated participant effect value by:

for each participant computing device, computing an individual participant effect value by dividing the particular number for the participant computing device by a current total number of video streams for the participant computing device;

computing the aggregated participant effect value as a summation of the individual participant effect values for each participant computing device.

17. The SFU of claim 10, wherein the one or more instruction, when executed by the one or more processors, further cause:

in response to disabling one or more of the digital video streams that are sent to the participant computing device of the subset of the plurality of participant computing devices, waiting a particular period of time;

after waiting the particular period of time, determining that the system load value is below a second load threshold value and, in response, selecting one or more participant computing devices of the subset of the plurality of participant computing devices;

restoring one or more of the disabled digital video streams.

18. The SFU of claim 10 wherein the plurality of participant computing devices comprises conference sets of participant computing devices, and wherein the one or more instruction, when executed by the one or more processors, further cause selecting the subset of the plurality of participant computing devices by:

selecting one or more of the conference sets of participant computing devices;

lowering a maximum stream number for the selected one or more of the conference sets;

for each participant computing device in the subset of the plurality of participant computing devices, determining that a number of the one or more digital video streams sent to the participant computing device exceeds the maximum stream number for a particular conference set of the selected one or more of the conference sets which includes the participant computing device.

\* \* \* \* \*